United States Patent [19]

Nguyen et al.

[11] Patent Number: 5,451,106
[45] Date of Patent: Sep. 19, 1995

[54] EXTENSIONAL FLOW MIXER

[75] Inventors: Xuan Q. Nguyen, Dollard des Ormeaux; Lechoslaw A. Utracki, Pierrefonds, both of Canada

[73] Assignee: National Research Council of Canada, Ottawa, Canada

[21] Appl. No.: 286,979

[22] Filed: Aug. 8, 1994

[51] Int. Cl.6 .............................................. B01F 5/06
[52] U.S. Cl. ................................. 366/176.2; 366/337; 138/42; 138/43; 138/46
[58] Field of Search ................. 366/87, 174, 176, 336, 366/337, 340, 341; 138/37, 40, 42, 45, 43, 46

[56] References Cited

U.S. PATENT DOCUMENTS

| | | | |
|---|---|---|---|
| 3,253,300 | 5/1966 | Gove | 366/304 |
| 4,170,446 | 10/1979 | Schutz | 366/87 |
| 4,334,783 | 6/1982 | Suzaka | 366/341 |
| 4,573,801 | 3/1986 | Leschonski | 366/176 |

FOREIGN PATENT DOCUMENTS

| | | | |
|---|---|---|---|
| 3344011 | 3/1985 | Germany | 138/37 |
| 1062652 | 12/1983 | U.S.S.R. | 138/40 |
| 1255183 | 9/1986 | U.S.S.R. | 366/341 |

OTHER PUBLICATIONS

Grace, H. P., "Dispersion Phenomena in High Viscosity Immiscible Fluid Systems and Application of Static Mixers as Dispersion Devices in Such Systems", 1982, Chemical Engineering Communication, vol. 14, pp. 225–277.

Han, C. D., "Multiphase Flow in Polymer Processing", 1981, Academic Press, New York, pp. 250–255.

*Primary Examiner*—Timothy F. Simone
*Assistant Examiner*—Randall E. Chin

[57] ABSTRACT

A mixer for viscous liquids having an inlet for connection to a pressurized source of the liquids and an outlet for the mixed liquids. A series of chambers are arranged between the inlet and the outlet, these chambers being separated by several convergent/divergent surfaces providing narrow openings between said chambers. The openings are in the form of slits defined by the inner edges of dies which also form the convergent/divergent surfaces upstream and downstream of the slits. The chambers include parallel sided portions which allow for quiescent flow of liquid through these portions. At least some of the dies are movable to adjust the width of the slits. Preferably, the dies and chambers are annular and concentric, and the liquids pass radially inwardly through the narrow openings during mixing and are subjected to increasing stress as they progress through the slits.

9 Claims, 2 Drawing Sheets

EXTENSIONAL FLOW MIXER

FIELD OF THE INVENTION

The present invention relates to the mixing of plastic materials such as polymers, and especially the mixing of such materials having widely different viscosities, especially when a minor phase is highly viscous.

PRIOR ART

In compounding of polymers, distributive mixing is effected by use of so-called "motionless mixers" between a screw feeder and a die. In most cases they consist of a number N of alternating right and left-handed helical elements placed in a tubular housing equipped with the temperature control. The energy of mixing is provided by the pressure loss across the mixer. The splitting and recombination of streams results in a predictable number of striations, $2^N$. The advantage of such mixers is that they are accessories to standard type of compounding or processing equipment, not their integral part, and their main disadvantages are lack of easy adjustment and limited effectiveness in mixing. The basic principle behind their design is division and recombination of the flow stream. Since the flow division is of the shear type, the dispersive forces are usually weak, limited to the cases where the two liquids show similar viscosity i.e.:

$$\lambda = \eta_d / \eta_m \approx 1$$

where $\eta_d$ and $\eta_m$ are shear viscosities of, respectively, the dispersed phase and the matrix.

Experimental work by Grace, H. P., described in a paper presented at the Third Engineering Foundation Research Conference on Mixing, Andover, N.H. Aug. 9–14 (1971), has demonstrated that the dispersive mixing of two Newtonian liquids is more efficient in extensional flow than in shear flow. Extensional flow occurs for example when fluid converges from a reservoir to a capillary. In extensional flow, the mixing action only weakly depends on the viscosity ratio, $\lambda$, while shear flow mixers are unable to mix liquid systems having $\lambda \geq 3.8$. Several studies that followed, with Newtonian or non-Newtonian systems, confirmed Grace's conclusions. Unfortunately, there are presently used only few deformational systems where the extensional flow field dominates, viz., fibre spinning, four-rolls mill, and convergence.

It has long been known that extensional flow tends to deform drops into long prolate ellipsoids that upon cessation of flow disintegrate into a series of microdrops with diameter about twice as large as the smaller diameter of the prolate ellipsoid. It has also been observed by Han C. D., in "Multiphase Flow in Polymer Processing", Academic Press, New York (1981) that drops passing through a convergence (capillary flow) were broken into mini-drops with diameter one order of magnitude smaller. Thus, Han proposed that for dispersing the minor-phase polymer into fine droplets a system having a series of convergences and divergences with progressively smaller diameter of the restriction could be used. Han's mixer was never built. Other studies have shown that a good level of mixing can be obtained after three to five passages of the mixture through the same convergence, with cooling and remelting of the mixture each time. The resulting blends showed good levels of dispersive and distributive mixing.

Commercial apparatus using the concept of extensional mixing was described in U.S. Pat. No. 4,334,783 (Suzaka), which issued Jun. 15, 1982 to Showa Denko K. K. The Suzaka patent described an extensional flow mixer composed of a series of plates placed across the flow channel. In these plates the fluid mixture was forced to pass through a series of convergences and divergences. In this design, the diameter of the restriction was kept constant.

Most studies on liquid mixing with extensional flow used the convergent flow from a reservoir to a capillary. These studies made it possible to identify the following factors as most pertinent for the quality of the resulting blends:

Diameter of the convergence (e.g., capillary); $d_c$

The ratio of the reservoir-to-convergence diameters (or the degree of convergence), $C = d_r / d_c$;

The capillary length-to-diameter ratio, $R = L / d_c$;

The initial size of the drops of the dispersed phase, d;

The viscosity $\lambda_e = \eta_{ed} / \eta_{em}$, (Note that here not shear but elongational viscosities ($\eta_{ed}$ and $\eta_{em}$) are important. Furthermore, their values, $\eta_{ed}$ and $\eta_{em}$ must be taken at the same set of independent variables; extensional stress $\sigma$, temperature, T, pressure, P, etc.);

Absolute value of the extensional stress, $\sigma$;

Number of passages through the convergence, n.

The resulting blends showed good levels of dispersive and distributive mixing. These results are particularly important for those trying to develop a mixer based on extensional flow.

The device described in the aforesaid Suzaka patent was evaluated using the following blends:

Polypropylene/ethylene propylene rubber, PP/EPR = 4/1; and

High-density polyethylene (linear low density) polyethylene/ethylene-butene copolymer, HDPE/LLDPE = 3/1.

For the first blend, passage through three convergences at shear rate $3450 \, s^{-1}$ resulted in a decrease of the melt flow index from MI (melt index) = 0.35 to 0.22, gram/10 minutes and a large increase of the environmental stress crack resistance, from ESCR = 80 to 1250 hours. For the second blend, after passage through three convergences the MI (melt index) was found unaffected, while the brittle temperature decreased from $-10°$ to $-20°$ C., the yield strength increased from 224 to 650 $kg/cm^3$, and the maximum strain at break increased from 80 to 680%. In spite of these interesting results the mixer is not being used by the company. The main problem has been the lack of basic knowledge that would make it possible to optimize the mixer configuration and process variables for each system of industrial interest. Lacking this knowledge, the company soon discovered that good results were obtained from some systems but not for others.

During the fifteen years that have passed since filing of the Suzaka patent there has been significant progress in the basic knowledge of microrheology and polymer blending. However, the difficulties of blending highly viscous minor phase into a polymeric matrix remain. The present invention arose from work with the following long-range goals:

To develop fundamental knowledge of flow and mixing physics in the extensional flow field, especially with convergent-divergent flow;

To construct new mixing devices to be used on the processing lines in a manner similar to the existing motionless mixers; and To develop a computer program that will provide an easy method of optimization of the mixing device configuration as well as the processing parameters.

First, a mixer similar to the one described by Suzaka was constructed and tested. The results indicated that:

Air bubbles were trapped in the convergent zone, modifying the flow pattern, thus making analysis of the flow difficult;

Any modification of the mixer required its total disassembly;

The pressure loss was large; and

The flow channel could be blocked by a contaminating particle.

SUMMARY OF THE INVENTION

The present invention has as an object to provide a convergent and divergent, extensional flow mixer that avoids the drawbacks of the Suzaka device. In designing the prototype extensional flow mixer, it was decided to incorporate the following features:

The mixture of two fluids must be exposed to strong extensional flow fields, each followed by a semi-quiescent zone;

These flow fields will be generated by a series of convergences and divergences of progressively increasing intensity;

The overall direction of flow will be in the radial (not axial) direction in the sense of the normal flow in an extruder;

To reduce the pressure drop, as well as to prevent blockage of the restrictive openings, a series of holes (e.g., in the Suzaka design) will be replaced by slits; and The extensional flow mixer will be adjustable.

In accordance with the invention, the mixer, as in the aforesaid Suzaka patent, has a series of chambers arranged between an inlet and an outlet, the chambers being separated by several convergent/divergent surfaces providing narrow openings between the chambers. In the present invention, unlike Suzaka, the openings are in the form of slits defined by the inner edges of protrusions formed on die members which form the convergent/divergent surfaces. Also, the die members are arranged so that the liquids are subjected to gradually increasing stress; for example this may be achieved by use of annular and concentric die member protrusions arranged so that during mixing the liquids pass radially inwards between said die members in passing from the inlet to the outlet. Furthermore, at least one of the die members is movable to adjust the width of the slits, thereby adjusting the stress level.

Preferably, the slits are separated by a semi-quiescent region of low stress; for example, parts of the chambers may be defined by opposed flat parallel faces.

As in the mixers of Han and of Suzaka, the extensional flow will be generated by a series of convergences and divergences but by forcing the liquid mixtures to flow radially from the rim reservoir toward the centre, the flow field is progressively intensified as the same volume of material must pass through slits with progressively narrower lengths. Thus, mathematically, the shear stress is inversely proportional to the radius of the slit. The invention also incorporates the important, and previously ignored, concept of semi-quiescent zones in which the fibrillated drops will have sufficient residence time for disintegration before the next convergent flow field will force them into the second-generation, finer fibres. Such zones are provided by the portions of the chambers defined by parallel faces. Another important feature is that the silts are adjustable at will, so that it can be narrow for difficult to disperse blends, and wider for easier to disperse (e.g., blends of polymers having similar rheological characteristic) mixtures.

BRIEF DESCRIPTION OF THE DRAWINGS

The invention will be further described with reference to the accompanying drawings, in which.

DETAILED DESCRIPTION

Figure 1:
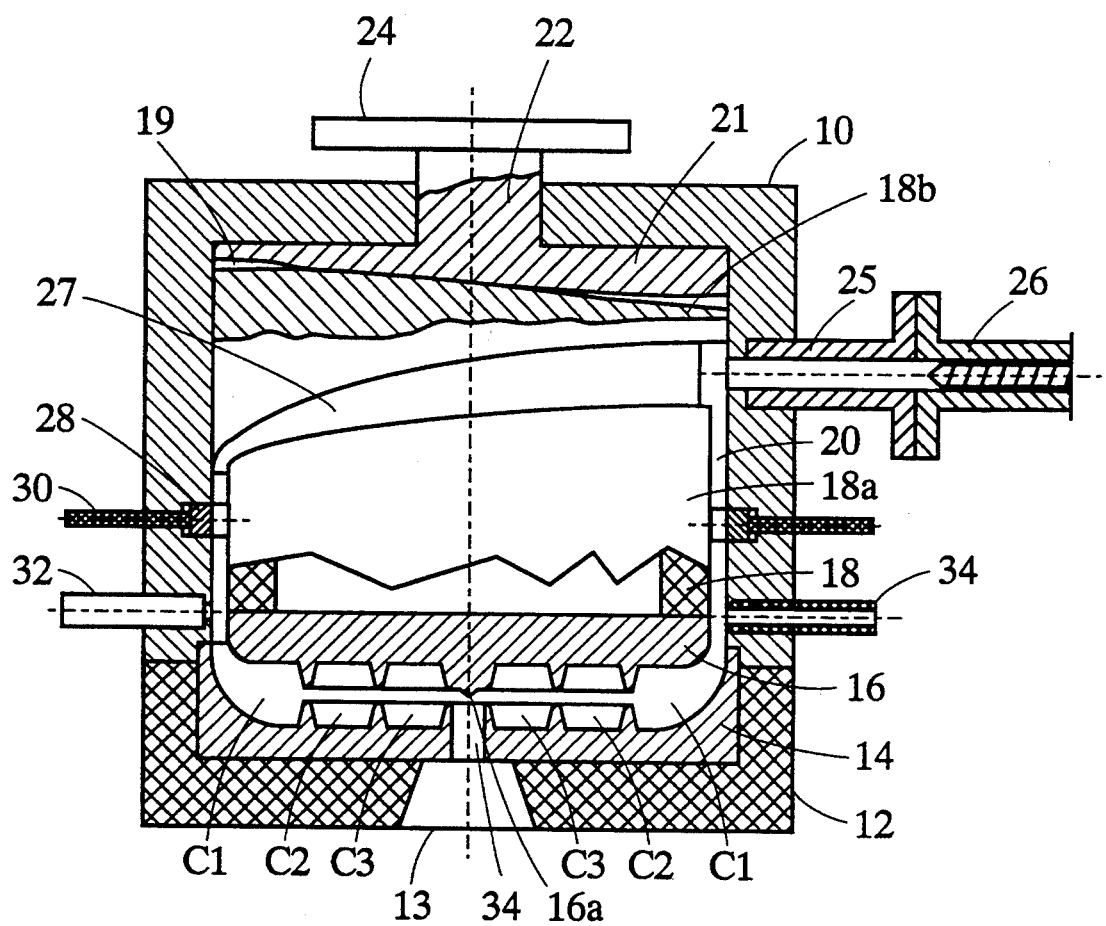
FIG. 1 is a sectional elevation of the mixer.

As shown in FIG. 1, the mixer has a cylindrical casing 10 with a removable bottom plate 12 having a central outlet 13. The bottom plate carries a lower die member 14, which is removable along with the bottom plate. An upper die member 16 is spaced above the lower die member and is held by the lower edges of a hollow cylindrical block 18. The lower part of this block, 18a, is spaced from the inside of the housing by a narrow gap 20, while an upper part of the block 18b seals against the inner surface of the housing 10. The upper end of block 18 has a sloping surface 19 which is contacted by a wedge shaped circular disc 21 connected to cylindrical extension 22 which passes through a central bore in the upper end of the housing and terminates in a plate 24. Plate 24 can be rotated so that rotation of disc 21 is effective to adjust the position of the block 18 and alter the separation of the die members.

In the wall of housing 10 is an adapter 25 connected to an extruder 26 which allows mixed liquids to be forced under pressure through an inlet in the housing and into the narrow space 20. A groove 27 formed between the upper and lower portions of block 18 has a wider end near the inlet and a narrow end at the opposite side of the housing; this assists distribution of the mixed liquid around the gap 20. The rate of flow in space 20 can be controlled by a so-called "strangling ring" 28, which is a discontinuous resilient ring the radius of which is controlled by levers 30. Below this ring, on one side of the housing, is a pressure sensor 32 which can continuously record the pressure, and on the opposite side is an auxiliary outlet 34. This outlet makes it possible to analyze the blend morphology before this enters the annular chambers.

Figure 2:
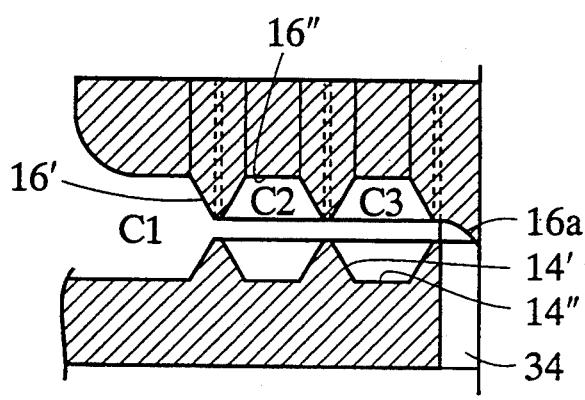
FIG. 2 is an enlarged sectional elevation of the die plates.
Figure 3:
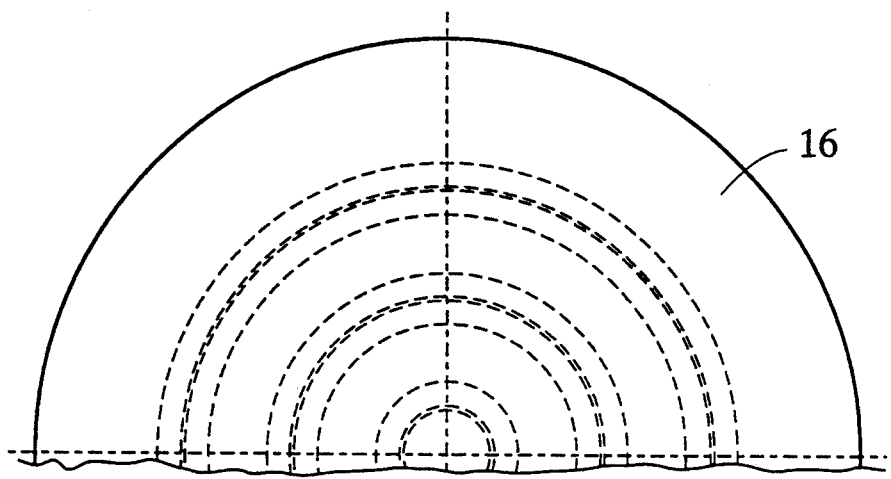
FIG. 3 is a partial plan view of the die plates.
Figure 4:
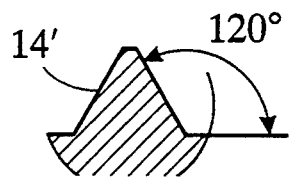
FIG. 4 is an enlarged view of a die.

FIGS. 2, 3 and 4 show in more detail the form of the die members. These carry lower and upper symmetrically opposed protrusions 14', 16', the protrusions having their opposed inner edges separated by slits, and having sloping side surfaces adjacent their inner edges which provide converging entrances into the slits and diverging exits therefrom, and which define in part an inlet chamber C1 and two intermediate chambers C2 and C3. Typically, the sloping convergent/divergent surfaces lie at 60° to the generally horizontal plane of overall flow of the liquids, (i.e. angle λ in FIG. 4 is 120°), although angles between ±15° of this preferred angle may be suitable. It will be seen that the die members provide opposed flat parallel faces 14'', 16'', which define intermediate portions of the chambers between the dies, these portions being more than one half and preferably more than 70% the radial extent of the chambers. These provide quiescent spaces. The slits are adjustable within a wide range, to provide convergence ratios (i.e. the ratio of chamber depth to slit gap, or the ratio of the spacing between said parallel faces to the spaces or gaps between the inner edges of the protrusions) preferably between 5:1 and 25:1. Accordingly, the transverse dimension of the intermediate portions of the chambers, as defined by the spacing between the parallel faces of the die members, is at least twice the slit gap. The lower die member 14 has an outlet bore 34 inwardly of chamber C3 leading to outlet 13, while the upper die member 16 has a central boss 16a with a central projection shaped to divert the liquid towards the outlet bore.

EXPERIMENTAL PROCEDURE

Two high density polyethylenes (PE), HBW557A, HEY352 coded respectively PE1 & PE2, and a polystyrene, GPPS220 or PS, were purchased from NOVACOR Chemicals, Ltd., Calgary, Alberta. Their characteristic parameters are listed in Table 1. Rheology of these resins was previously published by Bordereau, V. Shi., Z. H.; Utracki, L. A.; Sammut, P.; and Carrega M., in Polym. Eng. Sci., 32, 1824–1833 (1992). The studied blends contained 5 and 10 wt % PE1 and PE2 dispersed in PS as well as 5 and 10 wt % PS dispersed in PE1 and PE2. The viscosity ratios at the dynamic frequency $\omega = 100$ rad/s. was $\lambda(PE1/PS) = 1$ and $\lambda(PE2/PS) = 4$. The samples were prepared in a co-rotating, intermeshing twin-screw extruder at the screw speed N=250 rpm, the temperature profile T=180°, 185°, 190°, 195° and 200° C., and the throughput of 8.5 kg/h.

TABLE 1

| | | POLYMER CHARACTERISTICS | | | | | |
|---|---|---|---|---|---|---|---|
| Commercial Name | MF1 (g/10 min) | Density (kg/m³) | Use | \multicolumn{4}{c}{$\eta(kPas) = \eta_0[1 + (\tau\gamma)^{m_1}]^{m_2}$ at T = 200° C.} | | | |
| | | | | $\eta_0$(kPas), | $\tau$(s), | $m_1$, | $m_2$ |
| GPPS220 PS | 18 | 1040 | Injector | 5,194 | 0.3795 | 0.8170 | 0.9324 |
| HBW557A PE1 | 5 | 950 | Blow molding | 56130 | 150.8 | 0.1866 | 4.285 |
| HEY352 PE2 | 0.28 | 952 | Extrusion | 657.9 | 0.823 | 0.1593 | 6.0 |

MIXING PROCEDURE

The prototype extensional flow mixer, hereinafter referred to as the EFM, was made and tested with these mixtures.

Polystyrene, as well as the blends containing it, were dried overnight at 70° C. prior to extrusion. Four different mixing systems were used:
1) Single screw extruder with 25 mm screw;
2) Twin-screw extruder with 30 mm screws;
3) Single Screw extruder with the EFM; and
4) Twin-screw extruder with the EFM. In the latter two cases the extruder was used simply as a pump to the EFM.

To prepare blends, two feeding methods were used:
A. Granules of PE and PS were fed from gravitational feeders at the desired composition.
B. Mechanical pre-blend of PE and PS was fed directly to the extruder.

The temperature profile of the single-screw extruder was set as 185°, 190°, 195° and 200° C. The EFM when used was attached to the extruder using a custom-designed adapter. The adapter as well as the EFM was operated at 200° C. and throughput of 6 kg/h. The pressure drop across the EFM was adjusted to one of the three levels 10.3, 14.5, and 18.6 MPa (or 1500, 2100 and 2700 psi).

After the mixing experiments had been done, the mixed specimens for analysis were cut into small pieces, then wrapped into a filter with pore size of 0.1 μm and placed in the extractor. The PS matrix was dissolved in three days using chloroform as a solvent (Boiling point, $T_b = 6.17°$ C.). The remaining particles of the dispersed PE phase were re-dispersed in chloroform, deposited on the scanning electron microscope stage, and observed under the scanning electron microscope after being metallized with Au/Pd.

EXPERIMENTAL RESULTS

1) At Entry to EFM

The morphology of PE in the blends PE1/PS and PE2/PS at the entrance to the EFM is either fibrillar, particular, or both independently of the feeding method. The long fibres, after extraction of the PS matrix, are seen as entangled agglomerates. It is virtually impossible to determine the average length of these fibres. For the PE1/PS system, long fibres and nearly spherical particles were observed at all pressures (10.3, 14.5, and 18.6 MPa) and for blends containing both concentrations 5 and 10 wt % PE1. At the lowest pressure the fibre diameter varied from 0.5 to 10 μm, at the highest pressures the thickness varied from 0.5 to 5 μm, at both concentration levels. At these two higher pressures the number average fibre diameter was found to be respectively 1.2 and 0.7 μcm. It was interesting to see that most particles were obtained at the mid-pressure of 14.5 Pa.

The situation was different for the PE2/PS system. The morphology of this system was primarily particulate, with irregularly shaped particles and short elongated forms. The dimensions of PE2 particles at the entrance to the EFM varied in a very wide range. While some of these had sub-micron dimensions, others measured 17 by about 40 μm. Furthermore, while some of the irregularly shaped particles clearly originated from a coalescence of drops having few microns original diameter, the irregularly shaped fibres showed pearl-necklace structure, i.e., they did not have enough time to disintegrate into individual drops. Qualitatively, the best dispersion was obtained at the highest pressure drop, 18.6 MPa. Again, the concentration did not seem to play any role. These results reflect the fact that the zero shear viscosity of PE1 was 56 KPas, whereas that of PE2 only 0.66 kPas. Consequently, the high stress viscosity ratio in the first system was about one, whereas in the second system about four.

2) At Exit from EFM

At the exit from the EFM the blend PE1/PS was made of droplets having the diameter varying from d=0.4 to 1 μm, and infinitely long fibres with a diameter of about 1 μm. Increasing the pressure drop across the EFM to 14.5 MPa reduced the number of fibres and reduced the drops diameter to d=0.2 to 1 μm. At this pressure most particles were either spherical or had dumbbell shapes.

At the exit from the EFM the blend PE2/PS was made of a small number of fibres and mostly particles. At the lower pressure of 10.3 MPa the fibres were shorter and "fatter" than those at higher pressure of 14.5 MPa. Furthermore, by increasing the pressure from 10.3 to 14.5 MPa the initially irregularly shaped particles became finer (d=0.2–3 μm) and more spherical. These observations are valid for both concentrations of PE2, 5 and 10 wt %. The summary of observed morphologies is given in Table 2.

the pressurized melt to the EFM. Only blends containing 10 wt % of PE were used at a single pressure drop of P=18.6 PMa. As before, the morphology before and after the EFM was determined. Summary of the observed morphologies for both single and twin screw extruders is given in Table 3.

TABLE 3

MORPHOLOGY OF PE/PS BLENDS COMPOUNDED IN EXTRUDERS
(the length, l, and diameter, d, are in μm)

| Polymer System | Extruder | 5 wt % Fibres l,d | 5 wt % Particles l,d | 10 wt % Fibres l,d | 10 wt % Particles l/d |
|---|---|---|---|---|---|
| PE1/PS mixed | twin | l ≈ 10–30, d ≈ 1–2 | l/d ≈ 0.5/0.5 to 2/3 | irregular l ≈ 20–100; d ≈ 2–4 | irregular l/d ≈ 0.5/0.5 to 10/5 |
| PE1/PS mixed | twin quenched | not measured | not measured | l ≈ ∞; d ≈ 0.1–3 | nil |
| PE1/PS from 2-screw | single before EFM | not measured | not measured | l ≈ 10 to ω; d ≈ 1 to 2 | few particles; l/d = 0.2/0.2 to 1/2 |
| PE1PS from 2-screw | single after EFM | not measured | not measured | few fibres; l ≈ 4 to 15; d ≈ 1 to 2 | mostly l/d = 0.2/0.2 to 2/3 |
| PE2/PS mixed | twin | irregular shapes | l/d ≈ 0.5/0.5 to 7/20 | irregular shapes | l/d ≈ 0.5/5 to 10/15 |
| PE2/PS mixed | twin quenched | not measured | not measured | l ≈ ∞; d ≈ 0.01 | l/d = 1/1 to 30/10 |
| PE2/PS from 2-screw | single before EFM | not measured | not measured | nil | l/d = 0.5/0.5 to 10/15 |
| PE2/PS from 2-screw | single after EFM | not measured | not measured | nil | l/d = 0.2/0.2 to 4/10 |

DISCUSSION

Morphology at the End of a Single-Screw Extruder and the Entrance to EFM

As evident from the data in Table 2, increasing the pressure, i.e. the screw speed, tended to improve the degree of dispersion. Surprisingly, for the PE2/PS the best dispersion was observed at the mid-range of pressures 14.5 MPa.

TABLE 2

MORPHOLOGY OF PE/PS BLENDS BEFORE AND AFTER EFM
(the length, l, and diameter, d, are in μm)

| Polymer System | P (MPa) | BEFORE EFM Fibres l,d | BEFORE EFM Particles l,d | AFTER EFM Fibres l,d | AFTER EFM Particles d |
|---|---|---|---|---|---|
| PE1/PS | 10.3 | l ~ ∞; d = 05–10; $d_n$ = 1.2 | l/d = 1/1 to 2/3 | l ~ ∞; d = 0.5– | spheres and dumbbells 0.4–1.0 |
|  | 14.5 | l ~ ∞; d = 1–5 | l/d = 1/1 to 2/3 | l ~ ∞; d = 0.5 | 0.2 to 1.0 |
|  | 18.6 | l ~ ∞; d = 05– to 5; $d_n$ =0.7 | l/d = 0.2/0.2 to 1/2 | not measured | not measured |
| PE2/PS | 10.3 | very irregular shapes | l/d ≈ 0.5/0.5 to 17/40 | l ≦ 20; d = 1–3 | 0.5 to 5.0 |
|  | 14.5 | irregular shapes | l/d ≈ 0.2/0.2 to 2/4 | l ≦ 50; d = 0.2– | 0.1 to 3.0 |
|  | 18.6 | very irregular shapes | l/d ≈ 0.5/0.5 to 10/12 | not measured | not measured |

For comparison, PE1/PS and PE2/PS were also blended in a twin-screw extruder equipped with standard strand die. Prior to granulation the strands were either cooled down in air, or quenched in water. Because of the tension on the strand lines the molten blend near the face of the die was elongated, imposing additional deformation on the dispersed phase.

To check if pre-blending affects the morphology of materials dispersed in the EFM, the "cooled" granules were used to feed the single-screw extruder providing Blending PE1/PS was significantly easier than that of PE2/PS. In the latter system, the particles had complex, diverse shapes and sizes.

Changing the concentration from 5 to 10 wt % PE did not affect the degree of dispersion.

Comparing the data from Table 2 with corresponding results quoted in Table 3 it is evident that feeding the single screw extruder with pre-blends prepared in a twin-screw extruder resulted in a small improvement of dispersion, only. The improvement was restricted to reductions of the largest dimensions—either of fibres or of particles.

Morphology at the Exit from EFM

Passage through the EFM clearly improved the degree of dispersion for both blends, PE1/PS and PE2/PS at both compositions 5 and 10 wt % of PE.

The efficiency of the EFM depended mainly on pressure, but not on concentration.

For PE1/PS the fibrillar morphology seen before the entrance to EFM was transformed by the mixing die into fine droplet dispersion.

For PE2/PS the effect was even more pronounced, but in this case the final droplet dispersion (after the EFM) seems to be bimodal—while most of PE2 has been dispersed into very fine drops with a diameter about 0.1 $\mu$m a significant number of large drops with d∼2–3 $\mu$m remained.

Comparison of EFM Efficiency with that of Single- and Twin-Screw Extruders

Since the EFM is designed to be used at the exit from a single- of twin-screw extruder the efficiency of the device can be judged by comparing the morphology generated by an extruder (i.e. at the entrance to the EFM) with that of the EFM (i.e. at the exit from the mixing die). Examination of photographic results has shown that the improvement in the degree of dispersion is significant. The dispersion obtained using a single-screw extruder and the EFM was found to be superior to that obtained from a twin-screw extruder. As a consequence the EFM was found to lead to significant improvement of the degree of dispersion when placed at the end of either a single- or twin-screw extruder.

For PE2/PS blends ($\lambda$=4), the dispersion engendered by any mixer is difficult to evaluate. Qualitatively, for this system the effect of the EFM was found to be even more pronounced than in the case of PE1/PS. As mentioned above the EFM was seen to generate a bimodal distribution of particles—very fine drops with diameter d≈100 nm (limit of the extraction method!) and large drops with d≈2–3 $\mu$m. This system seems to be more "sluggish"—the particles generated (with exception of the very fine ones) are irregular in shape, and the small droplets do not seem to coalesce, etc. Significant improvement of morphology was also observed.

Performance of the EFM was studied at constant throughput of 6 kg/h at pressures (measured at the entrance to EFM) P=10.3, 14.5 and 18.6 MPa. The EFM was mounted at the end of a single screw extruder, to check the effect of EFM on morphology of two polyethylene/polystyrene systems; PE1/Ps with the viscosity ratio $\lambda$=1, and PE2/PS with $\lambda$=4. The results indicated that the EFM in accordance with the invention is capable to generate finer morphology than either a single-screw or twin-screw extruder.

We claim:

1. An extensional flow mixer for viscous liquids having an inlet for connection to a pressurized source of the liquids and having an outlet for the mixed liquids, and having a first die member and a second die member defining therebetween a series of chambers extending between the inlet and the outlet, said die members having protrusions with symmetrically opposed inner edges which define therebetween narrow openings in the form of slits, each slit defining a slit gap between said chambers, the protrusions having sloping side surfaces adjacent said inner edges which provide converging entrances into the slits and diverging exits therefrom, said chambers including intermediate portions defined by opposed flat parallel faces of the die members which allow for quiescent flow of liquid along said portions; and wherein at least one of the die members is movable to adjust the transverse dimensions of the slits as defined by the gap between said inner edges, and thereby to adjust the convergence ratio which is the ratio between the spacing of said parallel faces and the slit gap; and wherein said convergence ratio is at least 2:1.

2. A mixer according to claim 1, wherein said protrusions and said chambers are annular and concentric, the chambers including an outermost and an innermost chamber, the mixer further including an annular space which is in direct communication with said inlet and which leads to said outermost chamber, said innermost chamber leading directly to said outlet, whereby liquids passing radially inwardly of the die members through the slits during mixing are subjected to increasing stress as they progress through the chambers.

3. A mixer according to claim 2, further comprising a housing with a cylindrical cavity having a side wall, said side wall having said inlet and defining the outside of said annular space, the housing further including a block fixed to the movable die member and slidable to adjust the convergence ratio.

4. A mixer according to claim 1, wherein said intermediate portions of said chambers occupy more than one half the length of said chambers.

5. A mixer according to claim 1, wherein the ratio of the transverse dimensions of the chambers, as defined by the spacing between said parallel faces, to that of the slits, as defined by the gap between said inner edges, can be adjusted to between 2:1 and 40:1.

6. A mixer according to claim 1, wherein the ratio of the transverse dimensions of the chambers, as defined by the spacing between said parallel faces, to that of the slits, as defined by the gap between said inner edges, can be adjusted to between 5:1 and 25:1.

7. A mixer according to claim 1, wherein said inlet is connected to an outlet of an extruder.

8. An extensional flow mixer for viscous liquids, comprising:
a housing with a cylindrical cavity having a side wall;
an inlet into the side wall connectable to a pressurized source of the liquids;
a housing outlet for the mixed liquids at the center of one end of the housing;
a fixed die member at said one end of said cylindrical cavity, said fixed die member having a central die outlet;
said fixed die member further carrying annular concentric protrusions surrounding said central die outlet, said central die outlet communicating with the housing outlet;
a block slidable in said cylindrical cavity,
a movable die member fixed to said block and carrying annular, concentric protrusions having inner edges, the protrusions of the fixed die member having inner edges symmetrically opposed to said inner edges of the movable die member, and said protrusions having sloping side surfaces to divide the space between the die members into a series of annular chambers separated by annular slits defined by said inner edges of said die members, with said sloping side surfaces providing convergent entrances to, and divergent exits from, the slits;

said movable die member and an adjacent part of the block being spaced from said cylindrical sidewall to provide an inlet passage for liquid from the side wall inlet to the outermost of said chambers, whereby liquid can pass radially through the successive chambers and slits therebetween in passing from the inlet to the outlet; and means for adjusting the position of said block in the housing to alter the slit gaps.

9. A mixer according to claim 8, wherein said chambers include intermediate portions bounded by opposed flat parallel faces of the die members, which allow for quiescent flow of liquid along said intermediate portions.

* * * * *